(12) United States Patent
Chin et al.

(10) Patent No.: US 7,102,123 B2
(45) Date of Patent: Sep. 5, 2006

(54) REFLECTIVE IMAGING ENCODER

(75) Inventors: Yee Loong Chin, Perak (MY); Kok Hing Fo, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 10/696,247

(22) Filed: Oct. 28, 2003

(65) Prior Publication Data
US 2005/0087681 A1    Apr. 28, 2005

(51) Int. Cl.
*G01D 5/34* (2006.01)
(52) U.S. Cl. ............ 250/231.13; 356/617
(58) Field of Classification Search ............ 250/231.13–231.18; 356/614–617, 622; 33/1 PT, 33/1 N; 341/11, 13
See application file for complete search history.

(56) References Cited

U.S. PATENT DOCUMENTS

| | | | | |
|---|---|---|---|---|
| 4,587,513 A * | 5/1986 | Burrowes et al. | ............ | 341/13 |
| 5,001,937 A * | 3/1991 | Bechtel et al. | .......... | 73/862.324 |
| 5,317,149 A * | 5/1994 | Uebbing et al. | ........ | 250/231.14 |
| 5,886,350 A * | 3/1999 | Cook et al. | ................. | 250/225 |
| 6,603,115 B1 * | 8/2003 | Gordon-Ingram | ...... | 250/231.14 |
| 6,768,101 B1 * | 7/2004 | Lee et al. | .............. | 250/231.13 |
| 6,803,560 B1 * | 10/2004 | Okumura et al. | ....... | 250/231.16 |
| 2002/0195550 A1* | 12/2002 | McQueen | ............... | 250/231.13 |
| 2004/0061044 A1* | 4/2004 | Soar | ...................... | 250/231.13 |
| 2004/0200957 A1* | 10/2004 | Teng et al. | ............ | 250/231.13 |

* cited by examiner

*Primary Examiner*—Stephone B. Allen
*Assistant Examiner*—Davienne Monbleau

(57) ABSTRACT

Reflective image encoder. A reflective image encoder has an emitter such as one or more light emitting diodes, a diffuse reflective coder such as a code wheel or code strip reflecting a portion of the light from the emitter, an imaging lens forming an inverted image on to a detector. The reflective image encoder may include apertures on either or both sides of the imaging lens, and may include baffles to minimize stray light reaching the detector.

13 Claims, 6 Drawing Sheets

REFLECTIVE IMAGING ENCODER

BACKGROUND OF THE INVENTION

1. Field of the Invention

The present invention pertains to the art of optical encoders, and more particularly, to the art of reflective optical encoders.

2. Art Background

Optical encoders are used in a variety of applications such as shaft encoders where an object's position or motion is sensed. In a reflective encoder, light from an emitter, usually a light emitting diode is directed at a coder such as a code wheel in the case of sensing rotary motion, or a code strip in the case of sensing linear motion. Specular reflections from reflective areas of the coder selectively reflect light from the emitter to a detector.

The performance of such an encoder and its resolution are limited by, among other considerations, the low degree of collimation of the emitter beam, diffused and scattered light caused by coder imperfections, and distortions due to encapsulation surrounding the detector.

SUMMARY OF THE INVENTION

A reflective imaging encoder comprises an emitter which may be one or more light emitting diodes, a diffuse reflective coder such as a code wheel or code strip reflecting a portion of the light from the emitter, and an imaging lens forming an inverted image on to a detector. The emitter and detector may be coplanar or mounted on the same substrate. Apertures on either side of the imaging lens may be included, and baffles may be used to minimize stray light reaching the detector. The imaging lens may be separate from the detector, or incorporated into the encapsulation of the detector.

BRIEF DESCRIPTION OF THE DRAWINGS

The present invention is described with respect to particular exemplary embodiments thereof and reference is made to the drawings in which.

DETAILED DESCRIPTION

Figure 1:
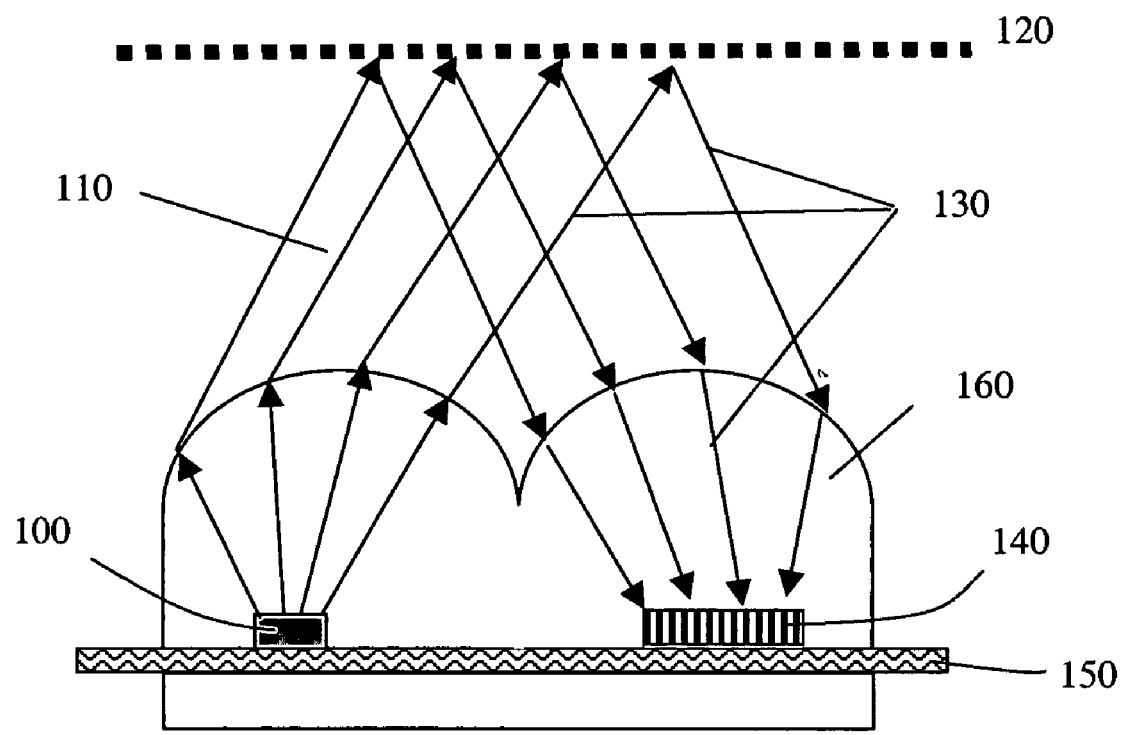
FIG. 1 shows a reflective encoder according to the prior art.

FIG. 1 shows a reflective encoder according to the prior art. Emitter 100 produces light rays 110 which strike coder 120. Reflected light 130 hits detector 140. Emitter 100 and detector 140 are mounted on substrate 150, and may be encapsulated 160. As coder 120 moves, changes in reflected light 130 change, and are sensed by detector 140. As is known to the art, emitter 100 is commonly a light emitting diode (LED). The operating wavelength of emitter 100 is commonly application specific, depending on considerations such as the nature of coder 120 and detector 140. Coder 120 preferably is of diffuse nature and able to selectively reflect emitted light rays 110 producing reflected light 130. Coder 120 is commonly a code wheel, used for sensing rotary motion, or a code strip, used in sensing linear motion. Coder 120 comprises alternating reflective and nonreflective elements. Detector 140 is commonly an array of photodiodes or similar CMOS imaging sensor.

Figure 2:
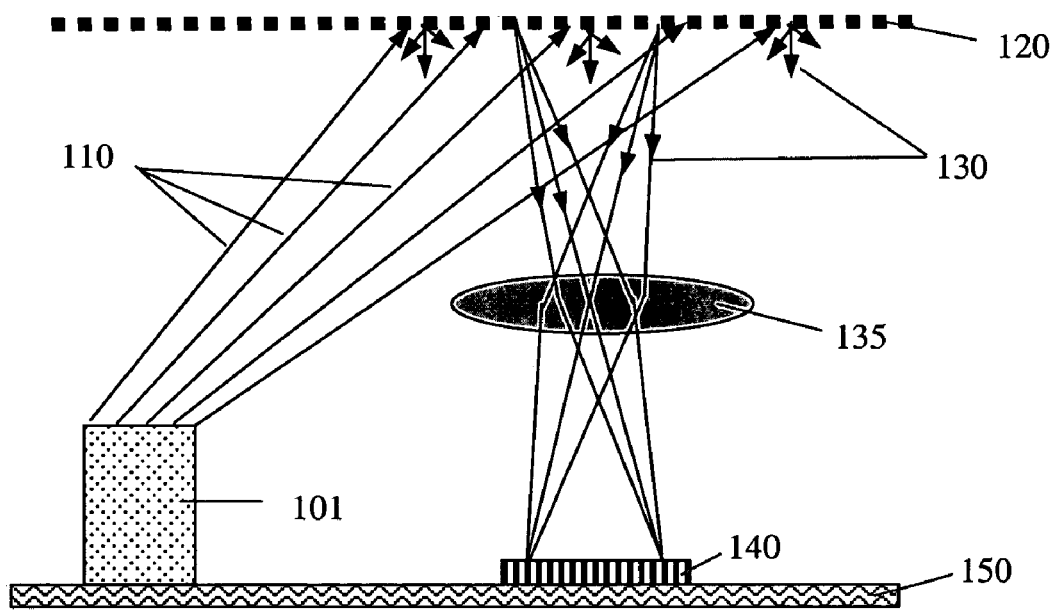
FIG. 2 shows a reflective imaging encoder according to the present invention.

FIG. 2 shows an embodiment of a reflective imaging encoder according to the present invention. Emitter 101 produces light rays 110 which strike coder 120. Reflected light 130 from coder 120 then passes through imaging lens 135 and is imaged on to detector 140. As shown in FIG. 2, imaging lens 135 reverses reflected light 130 from coder 120 to detector 140. As coder 120 moves from right to left in FIG. 2, the pattern of reflected light 130 striking detector 140 moves left to right. Emitter 101 is preferentially one or more light emitting diodes (LEDs), in the form of bare LED dice or encapsulated devices in order to improve light intensity against loss due to diffuse reflection of coder.

Figure 3A:
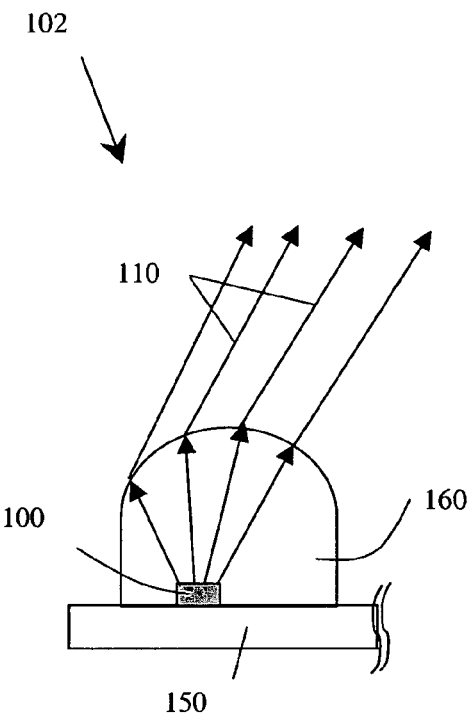
FIGS. 3a 3b, and 3c show emitter embodiments for use in the present invention.
Figure 3B:
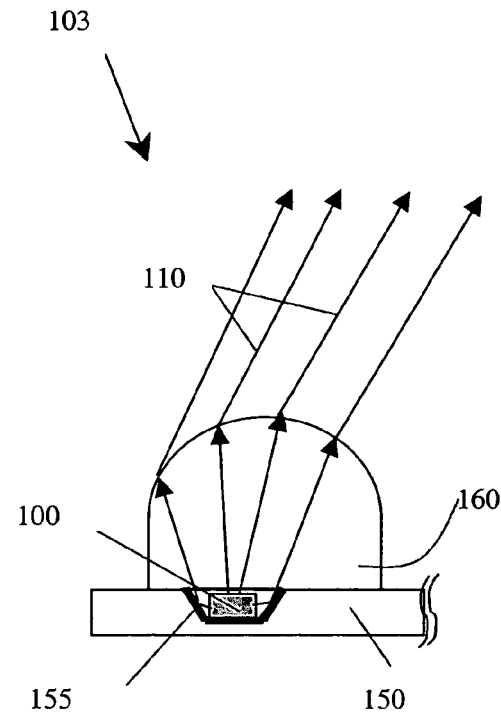
Figure 3C:
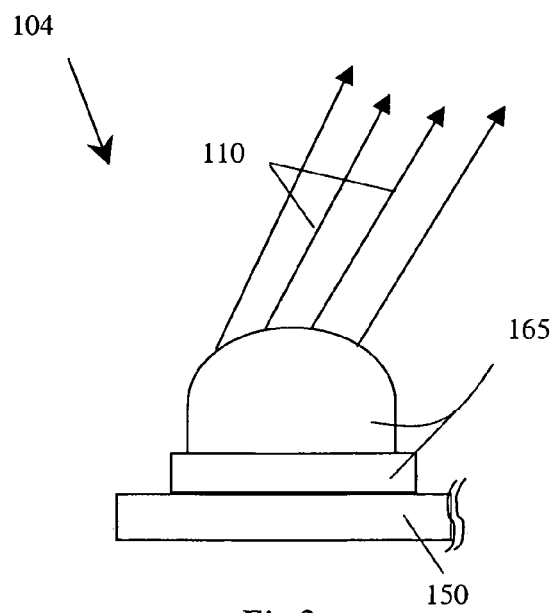

FIGS. 3a and 3b shows emitter embodiments for use with the present invention. As shown in FIGS. 1 and 2, coder 120 is commonly mounted midway on the optical path between emitter 101 and detector 140. In such an arrangement it would be beneficial for emitter 101 to produce most of its illumination at an angle. FIG. 3a shows one embodiment of an encapsulated emitter 102, which achieves this result. Commonly, the light emitting diode die in an encapsulated LED is mounted on the package's optical axis to focus light emitted from the die normal to the LED package. As shown in FIG. 3a, light emitting diode die 100 is mounted offset from the optical axis of encapsulation 160. This produces light rays 110 at an angle off normal. FIG. 3b shows an additional embodiment 103 in which light emitting diode die 100 is mounted in a reflector cup 155 which reflects incident light emitted from the edges of die 100 upward to maximize flux extraction. Again, emitted light rays 110 are produced at an angle off normal. FIG. 3c shows another additional embodiment 104 in which a packaged LED 165 is mounted on the substrate 150 as a separate component using different assembly process as compared to the emitter embodiments 102 and 103. The emitted light rays 110 from the packaged LED 165 are produced, preferably, at an angle off normal.

Figure 4A:
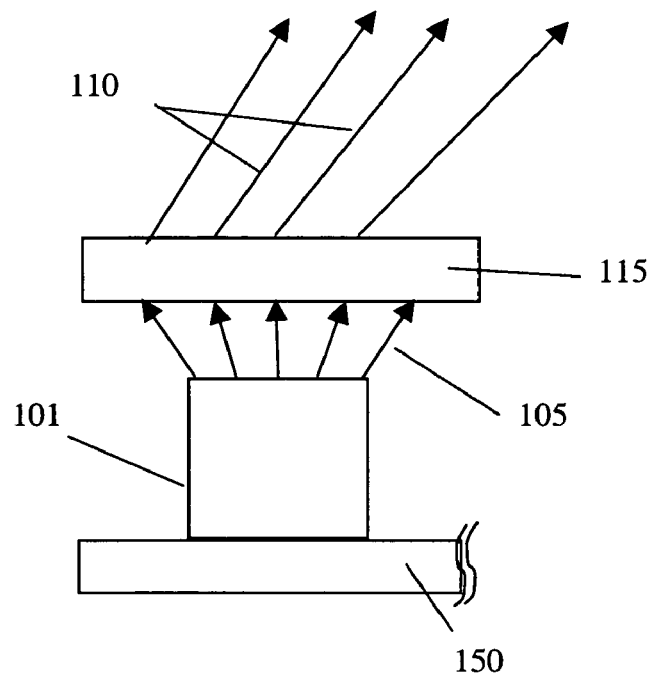
FIGS. 4a and 4b show embodiments of emitter configurations for use in the present invention.
Figure 4B:
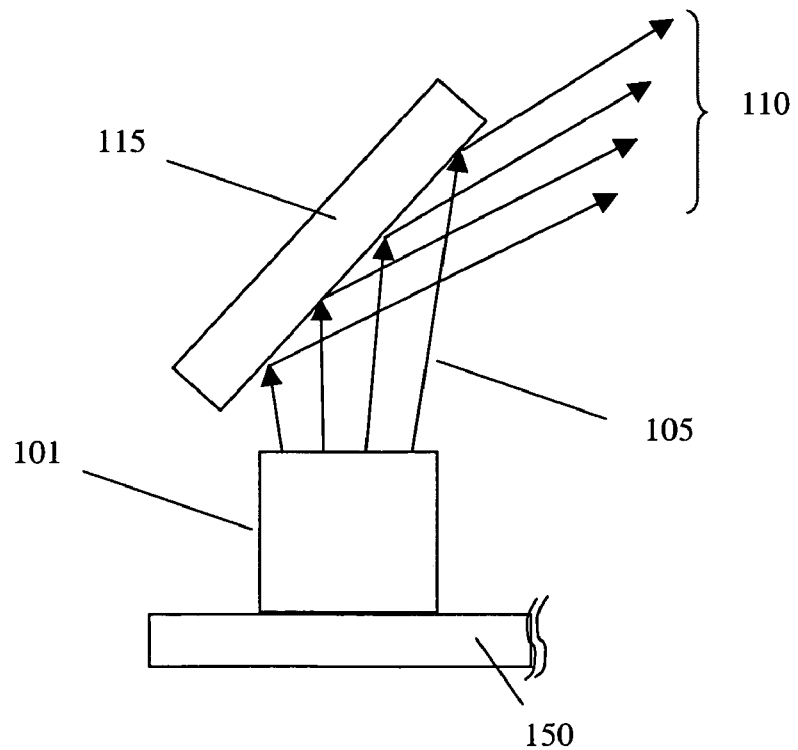

FIGS. 4a and 4b show alternate embodiments for producing off-axis illumination form an emitter. In FIG. 4a, light rays 105 from emitter 101 are altered by optical element 115, which may be a wedge or lens. In FIG. 4b, light rays 105 from emitter 101 are altered by reflective element 115. This reflective element may be a flat mirror, or may be curved, such as a parabolic or hyperbolic mirror.

Figure 5A:
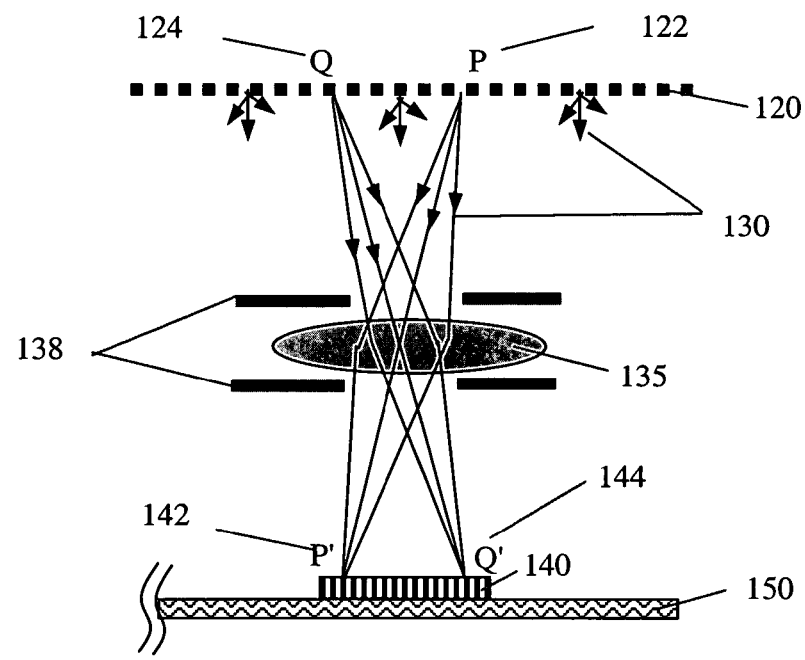
FIGS. 5a and 5b show embodiments of apertures and detector configurations for use in the present invention.
Figure 5B:
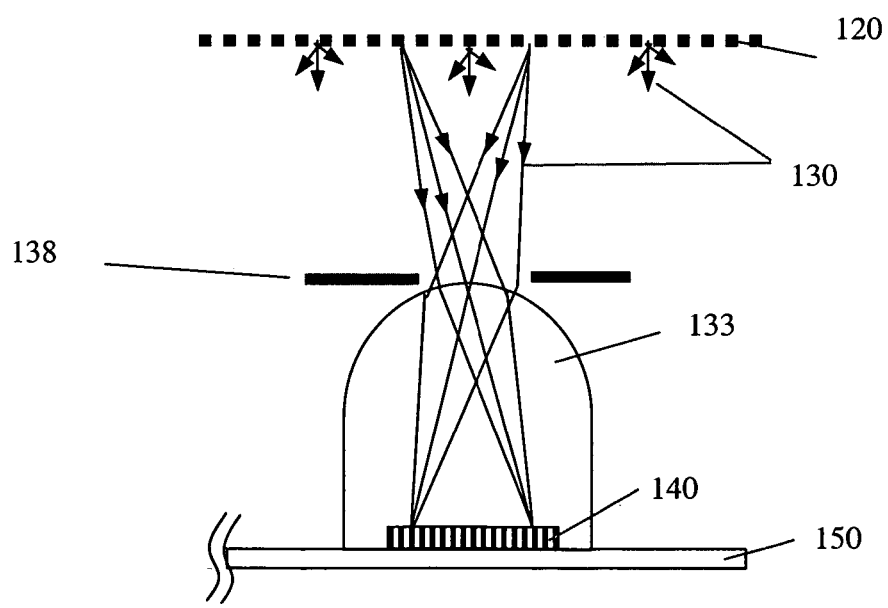

FIGS. 5a and 5b show apertures used to reduce stray light reaching detector 140. In FIG. 5a, apertures 138 restrict light entering or leaving imaging lens 135. Apertures may be present between coder 120 and imaging lens 135, or between imaging lens 135 and detector 140, or both. Also shown in FIG. 5a is the image inversion caused by imaging lens 135. Point P 122 on coder 120 is imaged by imaging lens 135 to point P' 142 on detector 140. Point Q 124 on coder 120 is imaged by imaging lens 135 to point Q' 144 on detector 140. FIG. 5b shows a single aperture 138, and an imaging lens 133 integrated as part of the encapsulation covering detector 140.

Figure 6:
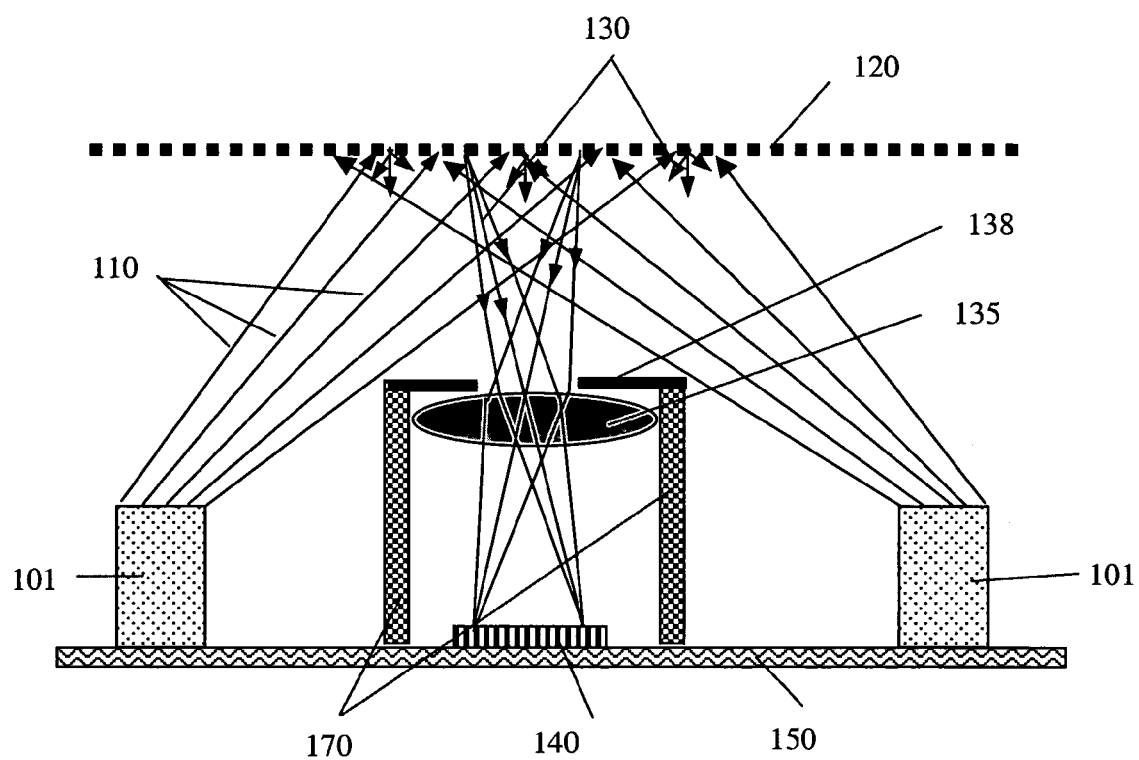
FIG. 6 shows a second embodiment of the present invention of a reflective imaging encoder.

FIG. 6 shows a second embodiment of the present invention. In this embodiment, multiple emitters 101 mounted to substrate 150 are used. In addition to aperture 138, baffles 170 are provided to shield detector 140. Baffles 170 need not meet aperture 138. Baffles 170 may surround detector 140, or may only be needed to interrupt direct paths between emitters 100 and detector 140.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A reflective imaging encoder comprising:
   a substrate;
   an encapsulated emitter mounted on the substrate, the encapsulated emitter comprising a light emitting element and an encapsulant, wherein the encapsulant has an encapsulant optical axis and the light emitting element is mounted offset from the encapsulant optical axis, the encapsulated emitter having an emitter optical axis and emitting light that is offset from the emitter optical axis;
   a diffuse reflective coder reflecting light from the encapsulated emitter;
   an imaging lens forming an inverted image of the reflected light from the coder;
   an image detector mounted on the substrate receiving the inverted image from the imaging lens; and
   a baffle between the encapsulated emitter and the image detector.

2. The reflective imaging encoder of claim 1 where the image detector is a photodiode array.

3. The reflective imaging encoder of claim 1 where the image detector is a CMOS imaging sensor.

4. The reflective imaging encoder of claim 1 where the encapsulated emitter is a light emitting diode.

5. The reflective imaging encoder of claim 4 where the encapsulated emitter is a packaged light emitting diode.

6. The reflective imaging encoder of claim 4 where the light emitting diode includes a reflector cup.

7. The reflective imaging encoder of claim 4 where the encapsulated emitter is a plurality of light emitting diodes.

8. The reflective imaging encoder of claim 1 where the imaging lens is separate from the detector.

9. The reflective imaging encoder of claim 1 where the imaging lens is incorporated into the encapsulation of the image detector.

10. The reflective imaging encoder of claim 1 further comprising an aperture between the coder and the imaging lens.

11. The reflective imaging encoder of claim 1 further including an aperture between the imaging lens and the detector.

12. The reflective imaging encoder of claim 1 further including a first aperture between the coder and the imaging lens and a second aperture between the imaging lens and the image detector.

13. The reflective imaging encoder of claim 1 where the detector is mounted on the optical axis of the imaging lens.

* * * * *